(12) United States Patent
Fiebig et al.

(10) Patent No.: US 7,197,373 B2
(45) Date of Patent: Mar. 27, 2007

(54) OPERATING MECHANISM, ELECTRICAL APPARATUS, AND ASSOCIATED METHOD OF OPERATION

(75) Inventors: Arnim Fiebig, Leinfelden-Echterdingen (DE); Guenter Lohr, Leinfelden-Echterdingen (DE); Stefan Roepke, Leinfelden (DE); Rainer Glauning, Aichtal-Groetzingen (DE); Bernd Wirnitzer, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 10/388,142

(22) Filed: Mar. 13, 2003

(65) Prior Publication Data

US 2003/0182016 A1 Sep. 25, 2003

(30) Foreign Application Priority Data

Mar. 19, 2002 (DE) .......................... 102 12 064

(51) Int. Cl.
*G06F 19/00* (2006.01)

(52) U.S. Cl. .................... 700/168; 340/825.23
(58) Field of Classification Search ................ 700/160, 700/168; 81/487; 340/825.23
See application file for complete search history.

(56) References Cited

U.S. PATENT DOCUMENTS

| 5,189,350 | A |   | 2/1993  | Mallett |
|-----------|---|---|---------|---------|
| 5,359,740 | A |   | 11/1994 | Naylor |
| 5,923,558 | A | * | 7/1999  | Fix ............................ 700/160 |
| 6,105,687 | A |   | 8/2000  | Hansson |
| 6,148,700 | A | * | 11/2000 | Uphotz .......................... 81/54 |
| 6,184,868 | B1| * | 2/2001  | Shahoian et al. ............. 345/61 |
| 6,369,472 | B1|   | 4/2002  | Grimm et al. |
| 6,390,205 | B2|   | 5/2002  | Wallgren et al. |
| 6,536,536 | B1| * | 3/2003  | Gass et al. ...................... 173/2 |
| 2002/0003045 | A1 |   | 1/2002 | Bongers-Ambrosius |
| 2003/0101019 | A1 |   | 5/2003 | Klausner et al. |

FOREIGN PATENT DOCUMENTS

| DE | 41 34 298   |   | 4/1993  |
|----|-------------|---|---------|
| DE | 44 12 073   |   | 10/1995 |
| DE | 197 16 520  |   | 11/1998 |
| DE | 100 24 636  |   | 11/2000 |
| DE | WO156144    | * | 8/2001  |
| DE | 100 07 308  |   | 8/2001  |
| DE | 100 33 362  |   | 1/2002  |
| EP | 0 039 962   |   | 11/1981 |
| EP | 0 935 337   |   | 8/1999  |
| EP | 1 008 423   |   | 6/2000  |
| GB | 2 215 148   |   | 9/1989  |
| GB | 2 288 249   |   | 10/1995 |
| JP | 57-5698     |   | 1/1982  |
| JP | 3-504193    |   | 9/1991  |
| JP | 11198057    |   | 7/1999  |
| JP | 11262877    |   | 9/1999  |
| JP | 2000176863  |   | 6/2000  |

* cited by examiner

*Primary Examiner*—Albert W. Paladini
(74) *Attorney, Agent, or Firm*—Michael J. Striker

(57) ABSTRACT

An operating mechanism for an electrical apparatus (10), in particular, for a hand-held machining tool, includes a storage (18, 20) for inputting of control data and/or a control program for controlling the electrical apparatus (10), as well as a control unit (16) connected with the storage (18, 20) for controlling the operation of the electrical apparatus (10) according to the stored control data or the stored control program. The storage (18, 20) in operation is re-writable, in order to enable the control program or the control data upon assembly to operate according to apparatus specifications or the control program or to adjust the control data during the operation. In addition, the invention relates to an electrical apparatus with the above-type of operating mechanism and a corresponding method of operation.

17 Claims, 2 Drawing Sheets

OPERATING MECHANISM, ELECTRICAL APPARATUS, AND ASSOCIATED METHOD OF OPERATION

BACKGROUND OF THE INVENTION

The present invention relates to an operating mechanism for an electrical apparatus, in particular, for a hand-held machining tool.

An operating mechanism of this type has a control unit, which controls the operation of the hand-held machining tool according to a specified control program or a corresponding control data, whereby the control program or the control data are stored in a non-volatile read-only storage or memory. As a control unit, for example, a microcontroller is used, which makes possible an intelligent controlling of the hand-held machining tool.

SUMMARY OF THE INVENTION

The invention includes the general technical teachings, with a type of operating mechanism for storing of the control data or the control program that uses a re-writable storage or memory for the electrical apparatus to be controlled, so that the control data or the control program can be modified upon manufacture of the electrical apparatus or during the operation.

This offers the advantage that a single type of an operating mechanism can be used for a plurality of different electrical apparatuses, whereby the manufacturing, logistical, and transport costs are minimized. With the assembly of the electrical apparatus to be controlled, an individual adjustment of the unitary operating mechanism can take place on the respective apparatus type, in which the associated control data or the control program developed for the respective apparatus type, is imported.

In addition, the re-writability of the storage advantageously makes it possible importing of actualized versions of the control program or the control data in the frame of customer service. The new versions of the control program, for example, can be obtained over the internet from the manufacture of the electrical apparatus, whereby the end user transfers the control program itself into the storage of the electrical apparatus to be controlled. It is also possible, however, that the new versions of the control program are imported from a maintenance and operation technician in to the storage of the electrical apparatus to be controlled.

A further advantage of the re-writability of the storage exists in the possibility of a self-adaptation of the control program or the stored control data in operation of the electrical apparatus. In the frame of this self-adaptation, for example, determined threshold values are modified as a function of the operating state of the electrical apparatus. In addition, the control data stored in the storage or the stored control program are adapted or adjusted to the mechanical behavior of the electrical apparatus to be controlled.

In addition, it is possible that data are stored in the storage, which reproduces the mechanical behavior or the degree of wear of the electrical apparatus to be controlled. These data can be read out from the storage, for example, in the frame of maintenance work on the electrical apparatus to be controlled, whereby as a function of the read-out degree of wear or the mechanical behavior, determined maintenance work is performed or worn parts are replaced.

The data stored in the storage about the mechanical behavior or the degree of wear of the electrical apparatus can also be evaluated by the control unit and can be represented by a display unit, so that the user of the electrical apparatus obtains information over the degree of wear. Thus, the display unit on the electrical apparatus can indicate when an exchange of worn parts probably is necessary, whereby the mechanical behavior up to this point and the actual degree of wear of the electrical apparatus is considered.

In a preferred embodiment of the invention, a data interface is provided, in order to enable external writing in the storage of the control data or the control program. In this connection, for example, an external programming apparatus can be used, which, by means of a cable connection or a wireless connection, is connected with the data interface of the electrical apparatus. The user then can input the desired control data on the programming apparatus or select the control program, which is then written in the storage of the inventive operating mechanism for the electrical apparatus via the data interface.

In addition, the control data stored in the storage or also the control program—as previously mentioned—can be read out by the data interface for maintenance work. The data interface thus makes possible a bi-directional data transfer.

It is also possible, however, that the data interface permits only a uni-directional data transfer from the external programming apparatus to the operating mechanism or, vise versa, from the operating mechanism to an external reading apparatus.

Preferably, the storage is not just re-writable once, rather rewritable multiple times, preferably as often as desired, such that the control program or the control data can be modified as often.

In a variation of the invention, at least two storages or memories are provided, whereby one of the storages is designated as a program storage and contains the control program, while the other storage is designated as a parameter storage and contains the apparatus-specific control data. The parameter storage preferably is a non-volatile storage or memory, which, however, in operation is rewritable. The program storage, likewise, preferably is a non-volatile storage, however, a read-only storage can be provided as a program storage.

For example, an EPROM (Erasable Programmable Read-Only Memory) or an EEPROM (Electrically Erasable Programmable Read Only Memory) can be used, however, the present invention is not limited to these types of memories.

In a preferred embodiment of the invention, the control unit has a microprocessor, a microcontroller, or a digital signal processor (DSP), which accesses the storage or memory and controls the electrical apparatus according to the stored control data therein or the stored control program.

In addition, in a variation of the invention, at least one sensor is provided, in order to detect a variable state of the electrical apparatus, such as, for example, the temperature. Preferably, the sensor is connected with the control unit, whereby the control unit modifies the control data stored in the memory, or the control program, according to the variable state detected by the sensor. For example, then, a current threshold value can be determined as a function of the temperature, in order to avoid overheating of the electrical apparatus. Instead of the temperature or in addition thereto, also other variable states can be detected, such as, for example, the manner of operation of a hand-held machining tool (drills, percussion drills or worms), the accumulator state, the rotational speed, the torque, the current, or the voltage. As a function of one or more variable states, other or further threshold values can be modified, such as, for example, a current threshold value, a rotational speed threshold value, a torque threshold value, or a temperature threshold value.

In addition, it is also possible that the control data stored in the storage or the control program stored in the storage can be adapted or adjusted individually to the user and/or the application. In this connection, the control unit preferably determines the mechanical behavior over a longer period of time and adapts the control program or the control data accordingly.

Moreover, also a self-adaptation of the stored control program or the control data saved in the storage is possible, in which the control unit, with the first initial operation of the electrical apparatus, determines the necessary control data or the correct control program and stores it in the memory.

In addition, the present invention relates to an electrical apparatus with the above-described inventive operating mechanism, whereby it can act with an electrical apparatus, for example, a hand-held machining tool, such as a hand drilling tool, an accumulator worm, or a grinding machine.

Finally, the invention also includes a corresponding method of operation, in which the control data or the control program is written upon the assembly or after the assembly of the electrical apparatus to be controlled, which was explained previously.

BRIEF DESCRIPTION OF THE DRAWINGS

Further advantages are provided from the following description of the drawings. In the drawings, one embodiment of the invention is represented. The drawings, the description, and the claims contain numerous features in combination. The practitioner also is to consider the features individually and combination them for further, appropriate combinations.

DETAILED DESCRIPTION OF THE PREFERRED EMBODIMENTS

Figure 1:
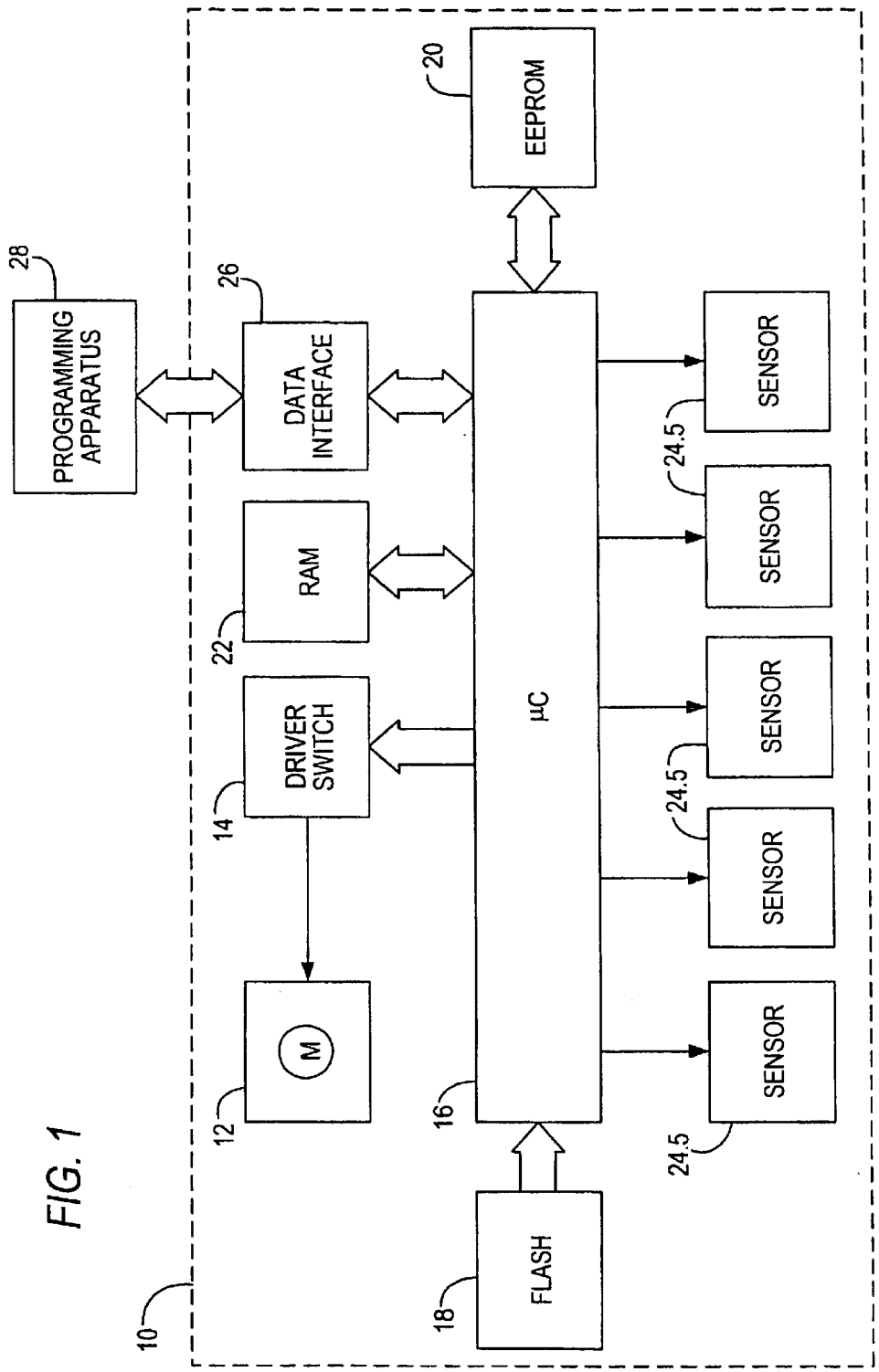
FIG. 1 shows a schematic bock diagram of a hand-held machining tool with an operating mechanism according to the present invention.

The block diagram in FIG. 1 shows a hand-held machining tool 10 with an electric motor 12, whereby the current supply of the hand-held machining tool 10 takes place in a common manner by an accumulator pack, which is not shown for purposes of simplicity.

For electrically controlling the electric motor 12, a driver switch 14 is provided, which, likewise, is constructed in the common manner.

In addition, the inventive operating mechanism has a microcontroller 16 as a control unit, whereby the microcontroller 16 is connected with a non-volatile program storage or memory 18 in the form of a so-called flash-memory, in which a control program is stored. The microcontroller 16 controls the operation of the hand-held machining tool 10, then, according to the control program that is stored in the program storage 18, in which corresponding control signals are provided to the driver switch 14.

In addition, the microcontroller 16 is also connected with a non-volatile parameter storage or memory 20 in the form of an EEPROM (Electronically Erasable Programmable Read Only Memory), which, however, in operation is re-writable, in which the apparatus-specified control data are stored. The stored contents of the parameter storage 20 are maintained upon switching on of the hand-held machining tool 10, so that the control data stored therein is not lost.

In addition, the microcontroller is connected with a common volatile processing memory in the form of a RAM (Random Access Memory), which is used during the operation of the microcontroller 16.

Moreover, the microcontroller 16 is also connected with multiple sensors 24.1–24.5, which respectively measure a variable state of the hand-held machining tool 10. The sensor 24.1, then, measures the rotational speed n of the electric motor 12, while the sensor 24.2 determines the temperature T within the hand-held machining tool 10, in order to avoid overheating. The sensor 24.3, in contrast, measures the torque M of the electric motor, whereas the sensor 24.4 measure the current I through the electric motor. Finally, the sensor 24.5 determines the manner of operation (drills, percussion drills or worms) of the hand-held machining tool 10.

The microcontroller 16 takes into consideration the variable states measured by the sensors 24.1–24.5, then, upon the controlling of the electric motor 12 via the driver switch 14. Thus, the control program stored in the program storage 18 calculates a current threshold value, for example, as a function of the measured temperature T, for controlling of the electric motor 12.

In addition, the illustrated hand-held machining tool 10 has a serial data interface, via which the hand-held machining tool 10 can be connected by means of an interface cable with an external programming apparatus 28. The user, then, can modified the control program on the programming apparatus 28 and transmit to the hand-held machining tool 10 via the data interface, whereupon the control program is then stored in the programming storage 18.

Moreover, the user can transmit an actualized version of the control program to the hand-held machining tool 10 by means of the programming apparatus 26. The new version of the control program can be obtained, for example, over the Internet or another data network from the manufacturer of the hand-held machining tool 10.

Further, the programming apparatus 26 makes possible a modification of the control data stored in the parameter storage 20, in order to employ another manner of operation, for example.

Furthermore, the user can read out data from the program storage 18 via the programming apparatus 26. Thus, the microcontroller 16 saves the variable states determined by the sensors 24.1–24.5 in the form of a utilization profile in the parameter storage 20. The user then can read out the saved utilization profile from the parameter storage 20 via the programming apparatus 26.

In addition, the microcontroller 16 calculates the degree of wear of the hand-held machining tool 10 as a function of the variable states measured by the sensors 24.1–24.5 and stores these in the parameter storage 20. Upon maintenance work, the degree of wear can be read from the parameter storage 20 to the programming apparatus 28, in order to exchange worn parts on the hand-held machining tool upon exceeding of a predetermined degree of wear.

Figure 2:
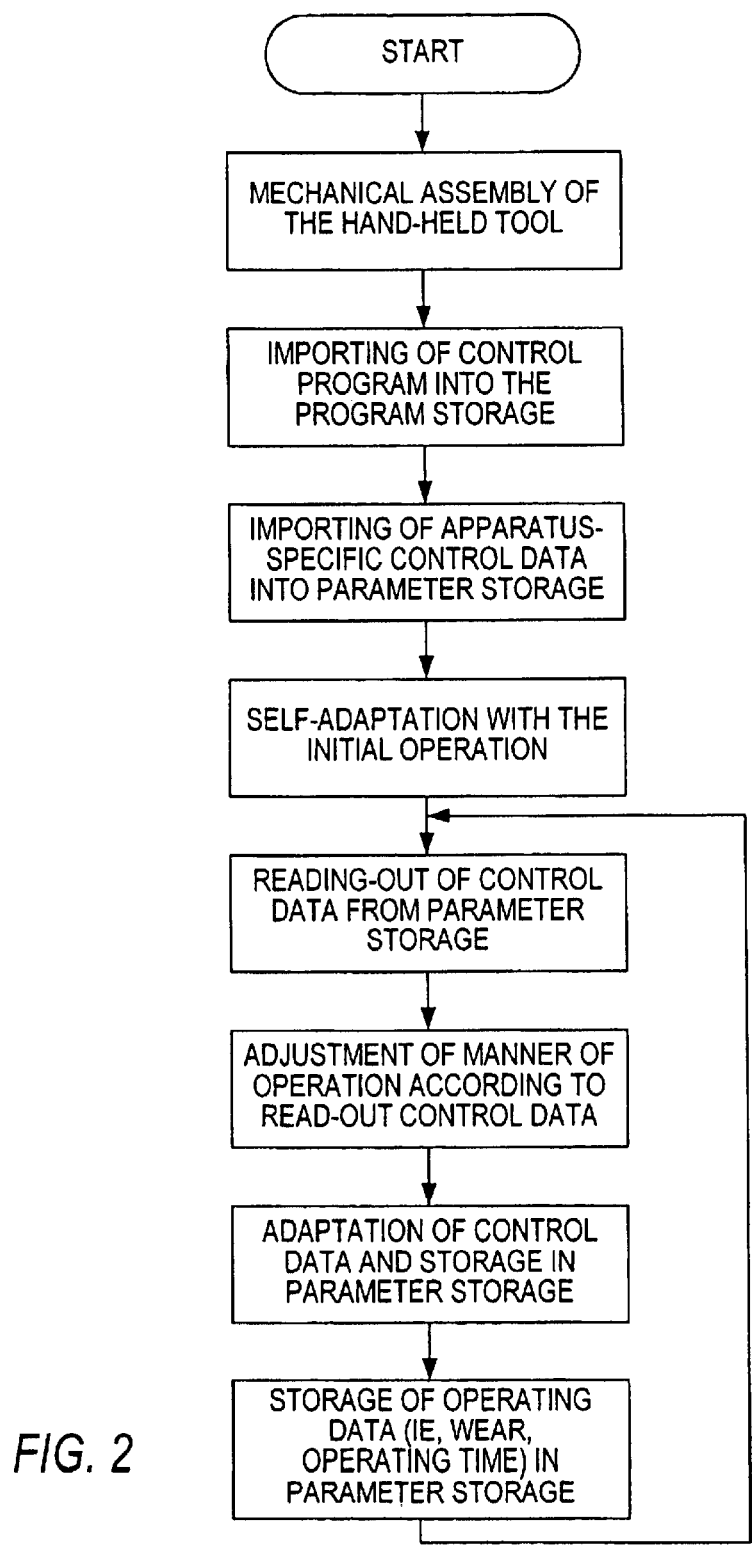
FIG. 2 shows the method of operation of the operating mechanism of the present invention as a flow diagram.

Next, the inventive method of operation will be described with reference to the flow diagram shown in FIG. 2, whereby reference is made to the foregoing description of the structure of the inventive hand-held machining tool 10.

Upon the mechanical assembly of the hand-held machining tool 10, only a single type of an operating mechanism is constructed, independent of the type of the respective hand-held machining tool 10, whereby advantageously, the manufacturing, storage, and transport costs are reduced.

The individual adaptation of the operating mechanism to the respective type of apparatus takes place, then, after the mechanical assembly, in which the programming apparatus 28 is connected via a cable with the data interface 26 of the hand-held machining tool 10.

Subsequently, then, for the control program adapted for the respective apparatus type is selected on the programming apparatus 28 and transmitted via the data interface 26 to the hand-held machining tool 10 and stored into the program storage 18, so that the hand-held machining tool 10 can be operated next in normal operation according to the specified control program.

In a further step, also apparatus-specific control data are input on the programming apparatus 28 and imported into the parameter storage 20 of the hand-held machining tool 10.

Upon the first initial operating use of the hand-held machining tool, then, a self-adaptation takes place, whereby the microcontroller 16 determines the necessary control data for operation and stores it in the parameter storage 20.

In addition, the microcontroller 16 also determines operating data, such as, for example, the degree of wear or the period of operation, and stores these in the parameter storage 20, so that the programming unit 28 can read out these operating data via the data interface 26.

It will be understood that each of the elements described above, or two or more together, may also find a useful application in other types of constructions differing from the types described above.

While the invention has been illustrated and described herein as an operating mechanism, an electrical apparatus, and a corresponding method of operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. Operating mechanism for an electrical apparatus (10), in particular, for a hand-held machine tool, with at least one storage (18, 20) for inputting of control data and/or a control program for controlling the electrical apparatus (10), as well as a control unit (16) connected with the storage (18, 20) for controlling operation of the electrical apparatus (10) corresponding to the stored control data and/or a stored control program, characterized in that the storage (18, 20) is writable in operation and for detection and measurement of at least one variable state of the electrical apparatus (10), at least one sensor 24.1–24.5 is provided.

2. Operating mechanism according to claim 1, characterized by at least one data interface (26), in order to write the storage (18) externally and/or to read out the control data or the control program from the storage (18, 20).

3. Operating mechanism according to claim 1, characterized in that for storing of the control program, a program storage (18) is provided and for storage of the control data, a parameter storage (20) is provided.

4. Operating mechanism according to claim 1, characterized in that the control unit (16) has a microprocessor, a microcontroller, and/or a digital signal processor.

5. Operating mechanism according to claim 1, characterized in that the control unit (16) adjusts the control data stored in the storage (20) and/or the control program stored in the storage (18) as a function of the measured variable state.

6. Operating mechanism according to claim 1, characterized in that the sensor (24.1–24.5) is a speed measuring apparatus (24.1), a temperature sensor (24.2), a torque measuring apparatus (24.3), a current measuring apparatus (24.4), or a voltage measuring apparatus.

7. Hand-held machining tool with an operating mechanism according to claim 1.

8. Method of operation for an electrical apparatus (10), in particular for a hand-held machining tool, in which in a storage (18, 20) of the electrical apparatus (10), control data and/or a control program for controlling operation of the electrical apparatus (10) is stored and a control unit controls the electrical apparatus (10) according to stored control program and/or the control data, characterized in that the control data and/or the control program are written after the assembly or upon the assembly of the electrical apparatus (10) into the re-writable storage (18, 20), and at least one variable state of the electrical apparatus (10) is detected and measured and the control data stored in the storage (18, 20) and/or the control program stored in the storage (18, 20) are adjusted as a function of the detected variable state.

9. Method of operation according to claim 8, characterized in that a threshold value for a variable state of the electrical apparatus (10) is determined as a function of the detected variable state.

10. Method of operation according to claim 9, characterized in that the threshold value is a temperature threshold value, a current threshold value, a rotational speed threshold value, a torsion threshold value, a voltage threshold value, and/or a capacity threshold value for the electrical apparatus (10).

11. Method of operation according to claim 9, characterized in that the detected variable state of the electrical apparatus (10) is a temperature, a speed, a torque, a voltage, a current, or a capacity or wherein the detected variable state reproduces a manner of operation of the electrical apparatus (10).

12. Method of operation according to claim 8, characterized in that the control data and/or the control program are read out externally from the storage (18, 20).

13. Method of operation according to claim 12, characterized in that the control data and/or the control program are written by means of a data Interface in the storage (18, 20) or are read out from the storage (18, 20).

14. Method of operation according to claim 8, characterized in that an adaptation of the control data and the control program to the electrical apparatus (10) is performed after a mechanical mounting and before a first use of the electrical apparatus (10).

15. Method of operation according to claim 8, characterized in that after a use, a modification of the control program with an external programming apparatus is performed.

16. Method of operation according to claim 8, characterized in that at least one variable state of the electric apparatus (10) is detected and a degree of wear of the electrical apparatus (10) is calculated in dependence on the variable state.

17. Method of operation according to claim 8, characterized in that the control data and/or the control program is adapted on a mechanical behavior of a user.

* * * * *